July 11, 1939.  F. L. FULLER  2,165,249
CARD PUNCHING MACHINE
Filed Dec. 17, 1936  9 Sheets-Sheet 1

July 11, 1939.   F. L. FULLER   2,165,249
CARD PUNCHING MACHINE
Filed Dec. 17, 1936   9 Sheets-Sheet 4

INVENTOR
Frederick L. Fuller
BY
ATTORNEY

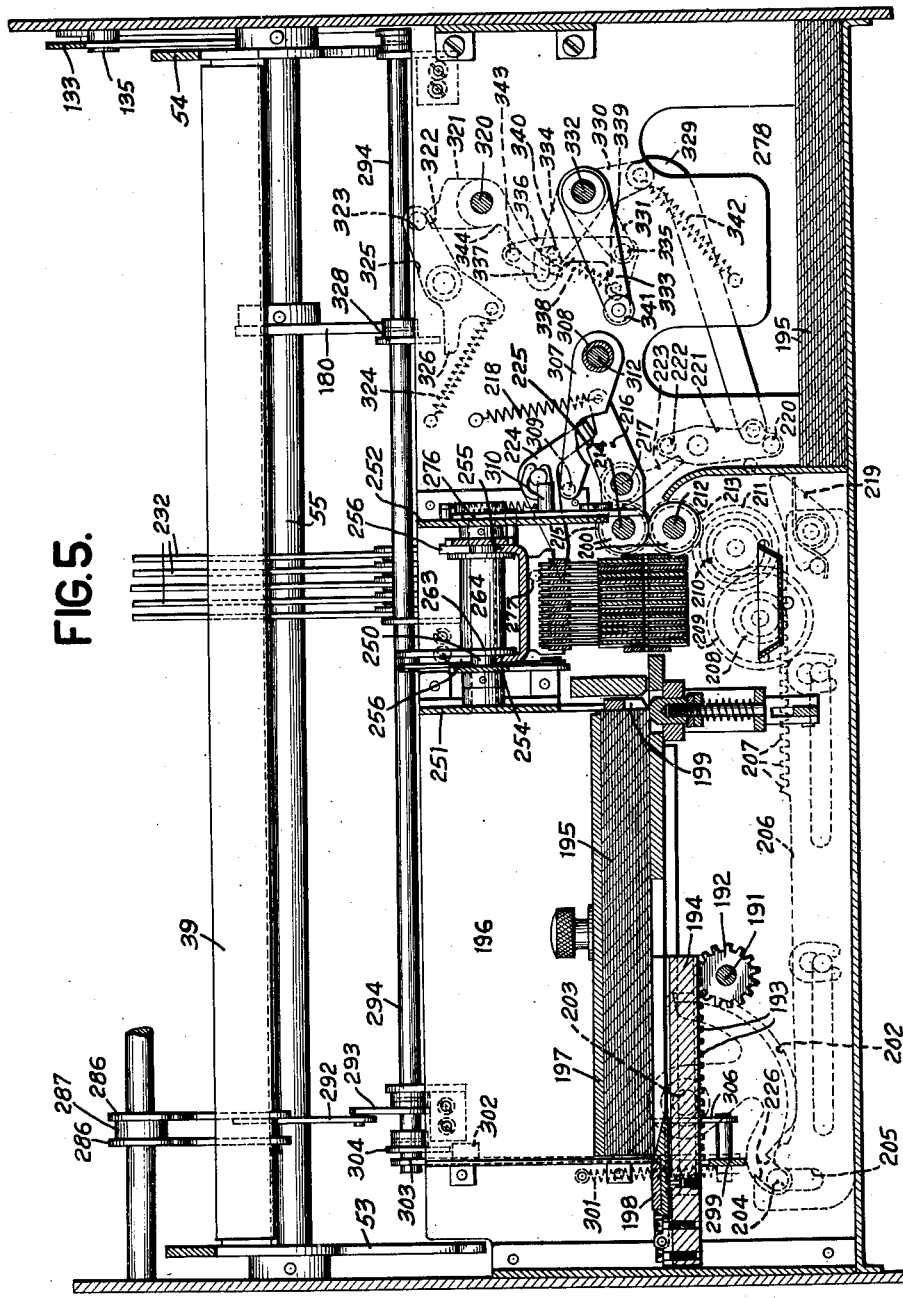

July 11, 1939.  F. L. FULLER  2,165,249
CARD PUNCHING MACHINE
Filed Dec. 17, 1936  9 Sheets-Sheet 6
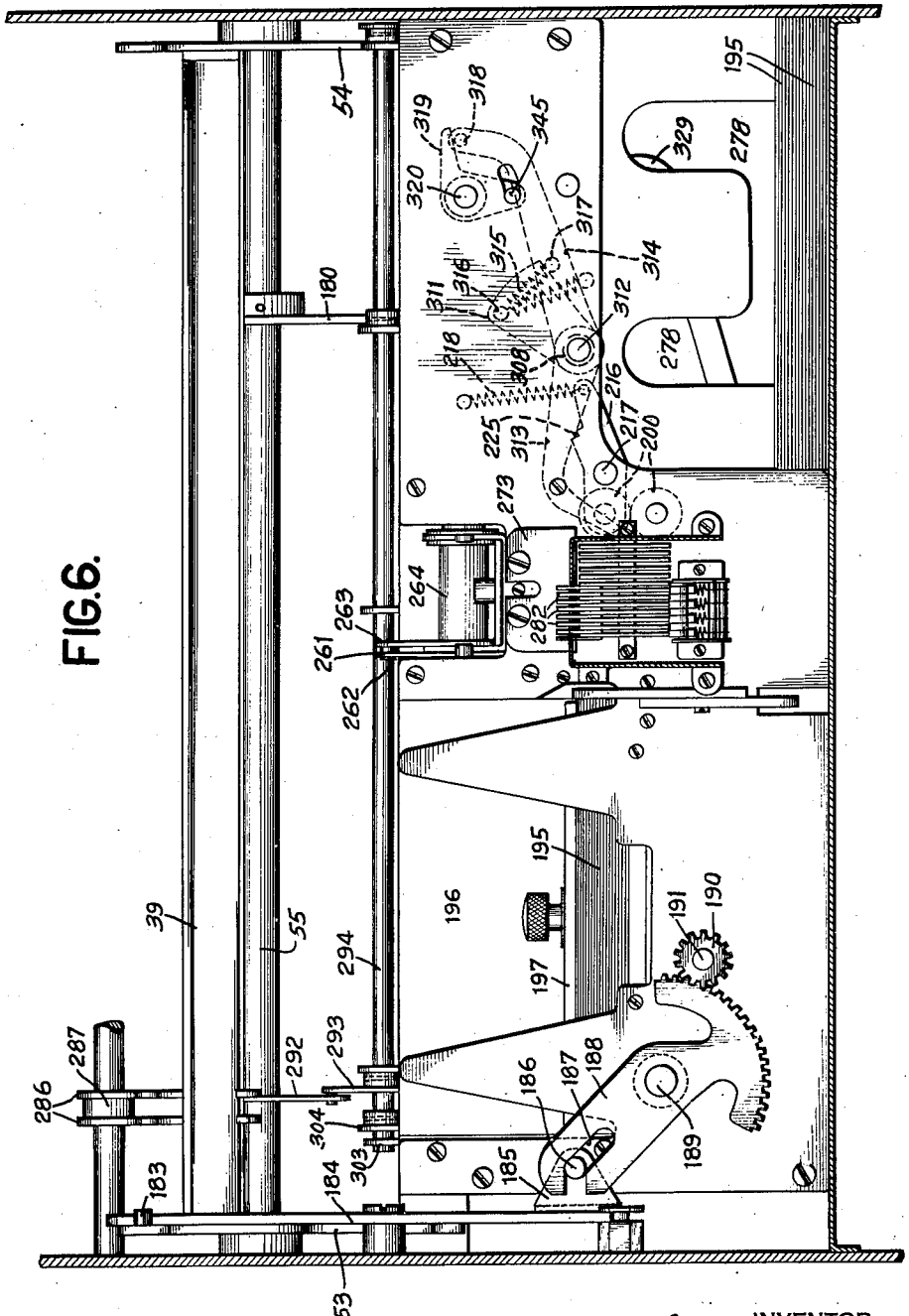
INVENTOR
Frederick L. Fuller
BY
W. M. Wilson
ATTORNEY

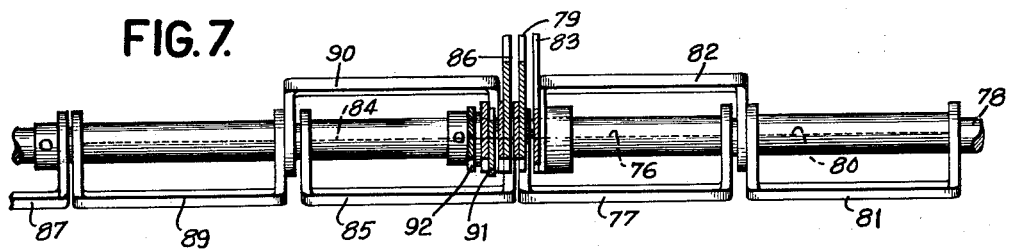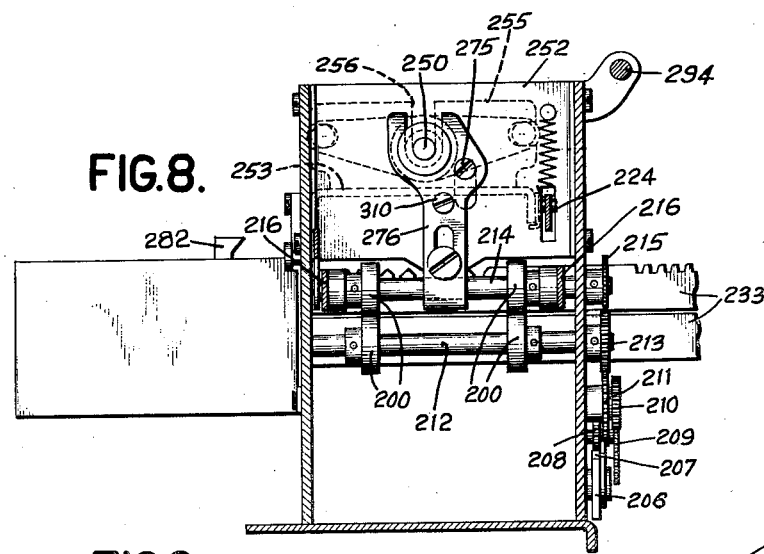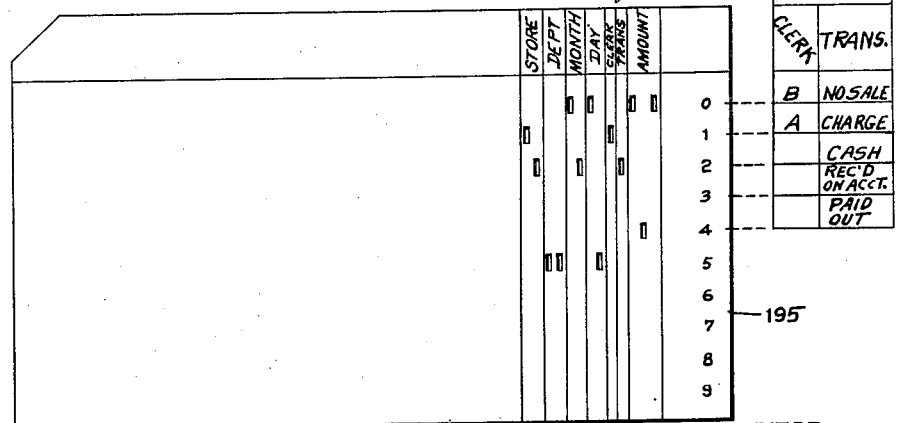

July 11, 1939.　　　F. L. FULLER　　　2,165,249
CARD PUNCHING MACHINE
Filed Dec. 17, 1936　　　9 Sheets-Sheet 8
FIG. 10.
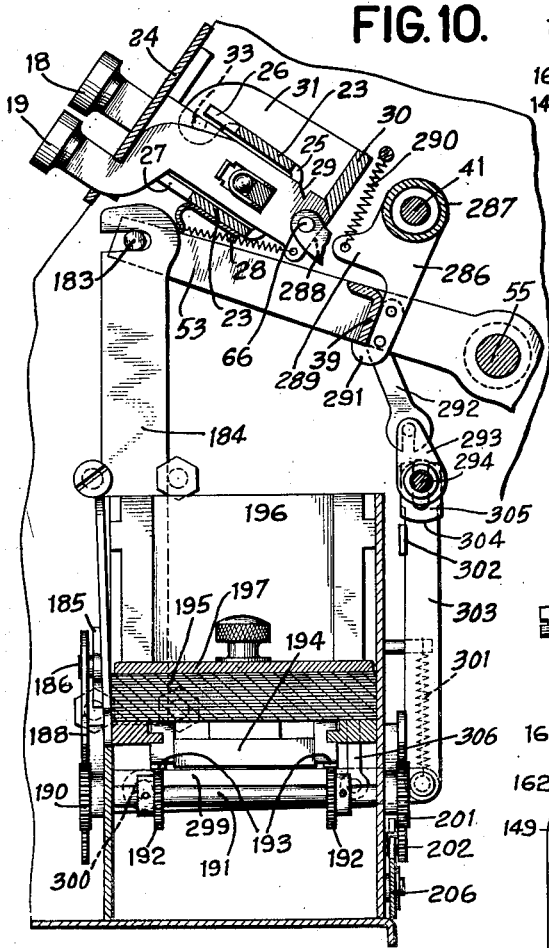
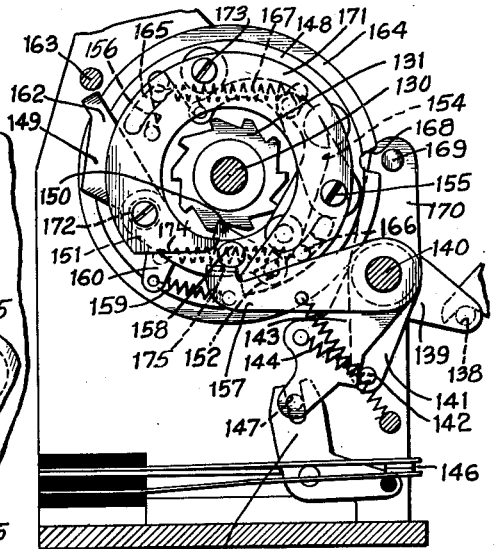
FIG. 12.
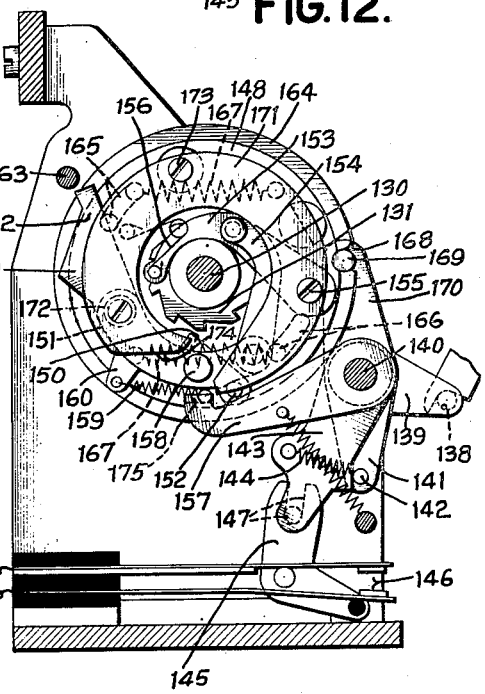
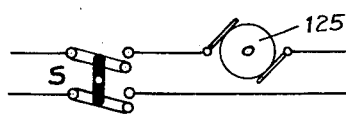
FIG. 11.
INVENTOR
Frederick L. Fuller
BY
W. M. Mahon
ATTORNEY July 11, 1939.  F. L. FULLER  2,165,249
CARD PUNCHING MACHINE
Filed Dec. 17, 1936   9 Sheets-Sheet 9

INVENTOR
Frederick L. Fuller
BY
ATTORNEY

Patented July 11, 1939

2,165,249

UNITED STATES PATENT OFFICE 2,165,249

CARD PUNCHING MACHINE

Frederick L. Fuller, West Orange, N. J., assignor to International Business Machines Corporation, New York, N. Y., a corporation of New York Application December 17, 1936, Serial No. 116,251

13 Claims. (Cl. 164—112)

This invention relates to accounting machines such as cash registers, or machines performing some or all of the functions of such machines as are now common in the market, and the invention relates to the incorporation of a punching mechanism in such machines in such a manner that for each operation of the machine a card will be punched so as to be capable of controlling tabulating and statistical machines of a type now on the market.

While such combinations have previously been devised the objects of the present invention relate namely to improvements in the card handling, card punching and locking mechanisms for such machines.

In connection with the card handling mechanism it is an object to devise a simple and efficient card feeding device which will feed the cards with certainty and to accomplish efficient card feeding operations by mechanisms which are simple to construct and positive in operation.

An object in connection with the card punching devices is to provide a simple punching device which comprises differentially set slides slotted so as to receive the card to be punched and carrying at opposite sides of the slot a die hole and a cooperating punching pin.

A still further object in connection with the punching mechanism is to devise an improved means for causing a positive operation of the punch pins by the machine and which includes a parallel operating mechanism which insures the even depression of the punch pins irrespective of where they have been positioned.

A still further object is to provide a motor with a manual control means such as a motor release bar for controlling the operation of the motor so that the latter can operate the machine.

A still further object is to prevent the operation of the motor release bar unless a clerk's key has been operated, which latter assigns a designation to the sale and transaction.

In connection with the locking mechanisms for the machine it is an object of the invention to devise a common lock for the clerks' keys which is rendered effective (1) when the supply of cards in the supply hopper is exhausted (2) when a card fails to feed from the supply hopper to the punching mechanism, or is improperly positioned in the punching mechanism, and (3) when the storage hopper is overfilled and beyond its normal capacity.

Due to the provision of an interlock between the clerks' keys and motor release bar the locking of the former under any of the circumstances noted above effectively locks the motor release bar as well.

While the invention has been shown in connection with a cash register any or all of the improvements described herein may be utilized in connection with a variety of machines, and the embodiment is to be considered as illustrative and not restrictive.

In said drawings:

Fig. 5 is a longitudinal sectional view of the card feeding mechanism and is taken on the line 5—5 of Fig. 4;

Fig. 6 is a front view of the card feeding mechanism and is taken on the line 6—6 of Fig. 4;

Fig. 7 is a detail view in plan showing certain of the operating connections;

Fig. 8 is a transverse sectional view of the card feeding mechanism and is taken on the line 8—8 of Fig. 4;

Fig. 9 is a plan view of one of the tabulating cards showing by way of example the manner in which perforations are made therein to designate certain data relating to a sale;

Fig. 10 is a sectional view of the card feeding mechanism and is taken on the line 10—10 of Fig. 4;

Fig. 11 is a view in side elevation taken on the line 11—11 of Fig. 4 and shows the clutch mechanism for causing the operation of the machine;

Fig. 12 is a view similar to Fig. 11 but showing the parts in operated position to effect the engagement of the clutch;

*Manipulative entry control devices*

Figure 1:
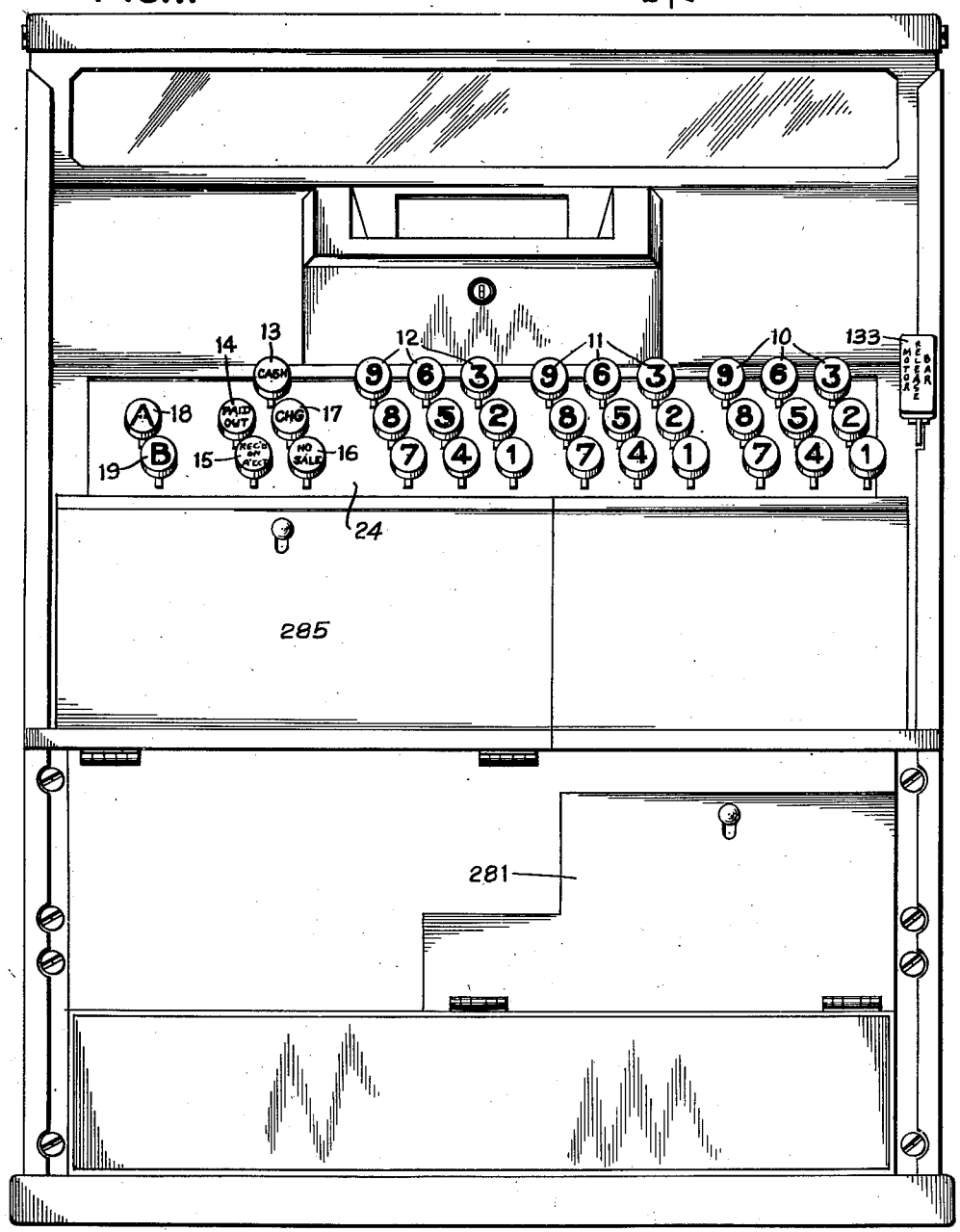
Fig. 1 is a front elevation of the exterior of the machine.

The machine includes three denominational groups of amount keys, shown best in Fig. 1, the numeral 10 designating the group for entering cents, numeral 11 designating the group for entering dimes, and numeral 12 designating the group for entering dollars.

In addition to these keys there is a key 13 designated "Cash", a key 14 designated "Paid out", a key 15 designated "Rec'd on acct.", a key 16 designated "No sale" and a key 17 designated "C'h'g." This group of keys comprises the transaction control keys.

For the selective entry of amounts according to a clerk's classification there is provided an "A" clerk's key 18, and a "B" clerk's key 19.

The keys of the groups of amount keys are depressed according to the amount to be entered, the clerk's keys according to which the clerk enters the amount and the transaction keys according to the type of transaction, as is well known and understood.

Each of the keys selected for operation is manually depressed prior to an operation of the machine and a key is locked in its depressed position by a construction now to be explained in detail for the group of cents keys 10, although it is to be understood that a similar construction is utilized for the other groups of keys.

Suitably attached to the left side frame plate 21 and the right side frame plate 22 (Figs. 2 and 4) is a U-shaped plate 23 to which is attached a transverse cover plate 24 (Figs. 2 and 3) for the groups of keys. The keys in each line from front to back are off-set laterally as shown in Fig. 1 to provide for a convenient manual manipulation and to also permit the lateral spacing of their respective operating members, to be referred to in detail hereinafter. The stem of each key passes through a related slot in the cover plate 24 and is further guided by a slot 25 (Fig. 3) in the U-shaped plate 23. With the exception of the center key of a single line the key stem is also guided by slots 26 and 27 in the U-shaped plate 23. Each key is held in its normal outward position by a related spring 28 (Fig. 3) but when a key is depressed inwardly a notch 29 (Fig. 3) thereof is caught by a detent plate 30 of the respective bank of keys. Each detent plate is carried by a pair of arms 31, 32 (Figs. 2 and 3) pivotally mounted at 33 to projecting ears of the U-shaped plate 23.

The detent plate 30 is so constructed that it is of the flexible type, i. e., an erroneously depressed key may be released by merely depressing another key in the same group. It is further understood that there is a detent plate 30 for each group of keys.

Key releasing devices

Figure 2:
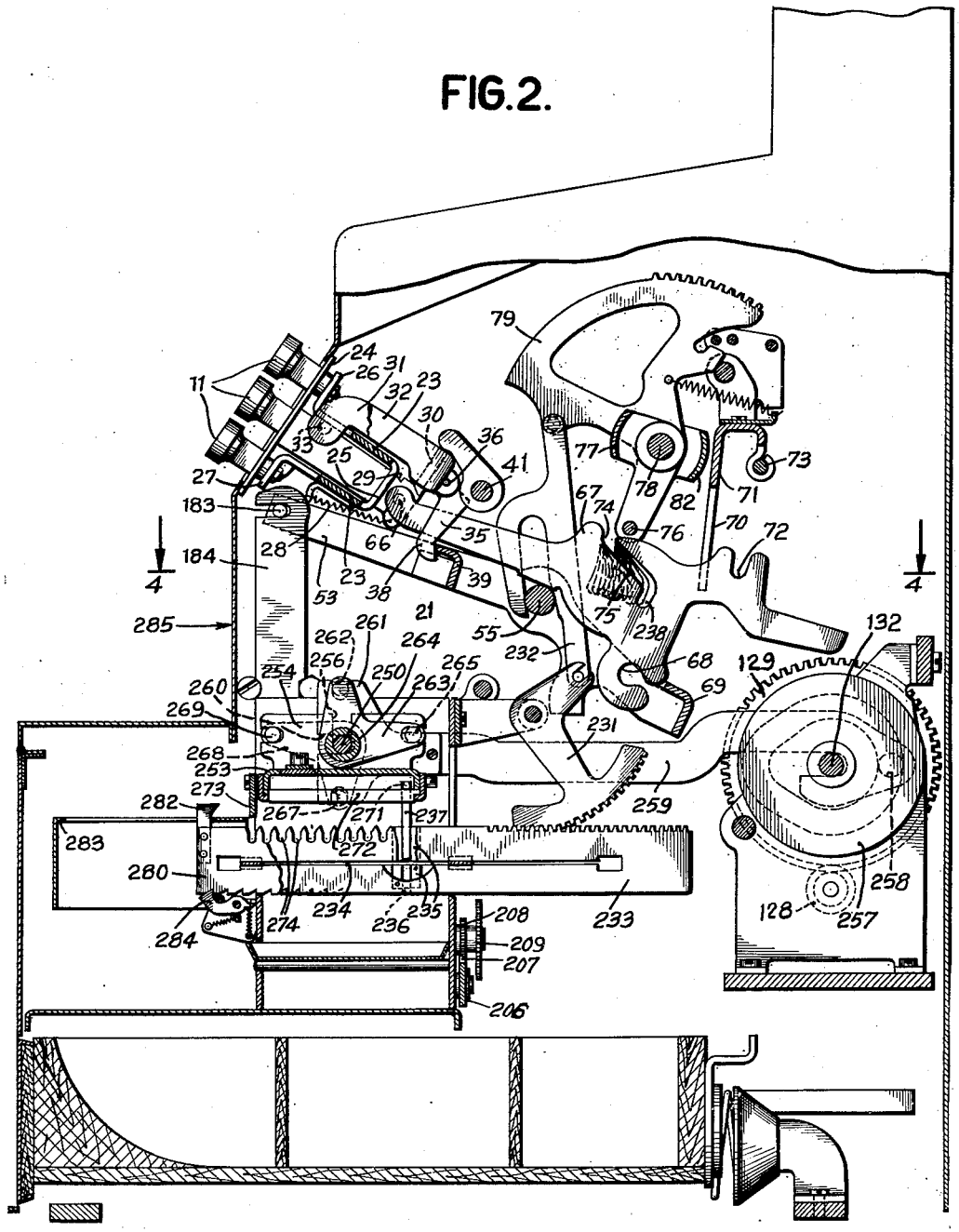
Fig. 2 is a transverse sectional view taken on the line 2—2 of Fig. 1.
Figure 3:
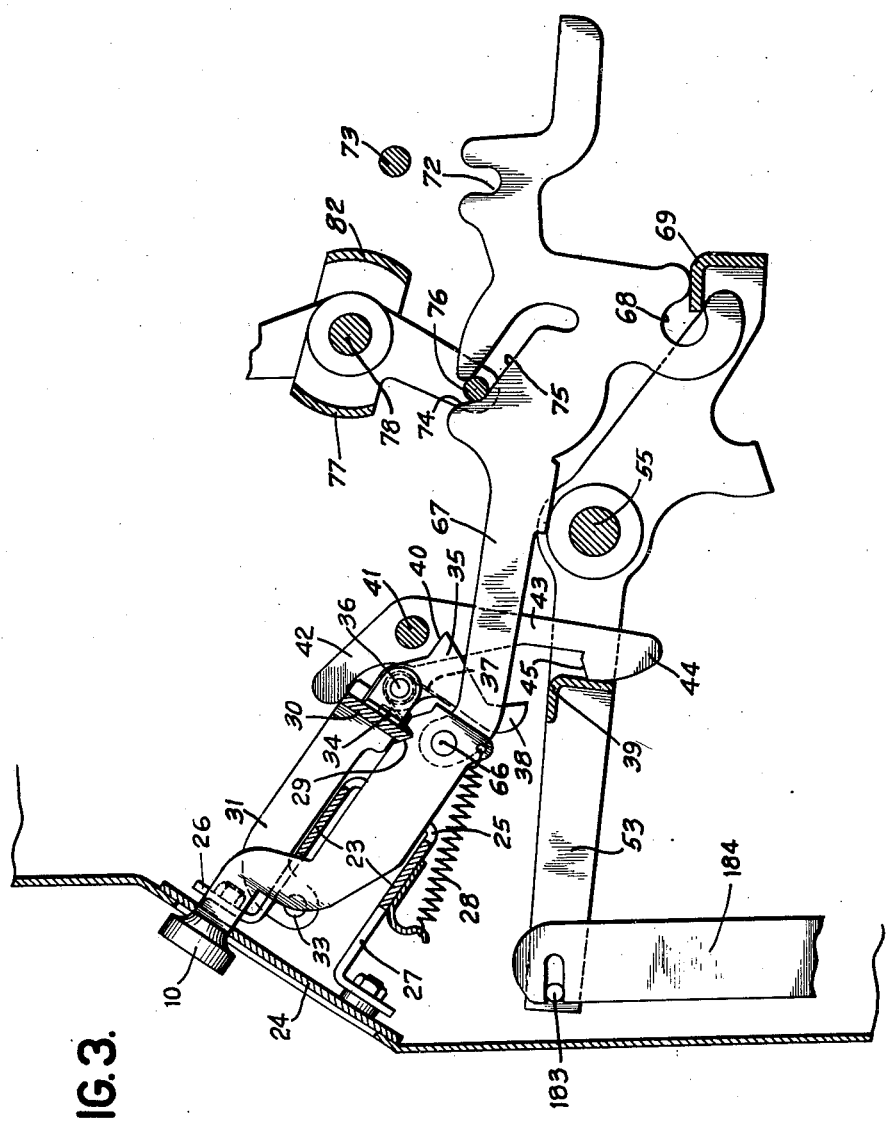
Fig. 3 is an enlarged view in side elevation showing particularly the key construction and parts of the differential mechanism shown in operated position.

It is, of course, necessary to release the depressed keys after an operation of the machine and to this end as best shown in Fig. 3 each detent plate 30 has secured thereto a bracket plate 34 to which is pivoted at 36 a spring urged pawl 35. A coil spring 37 urges the pawl 35 counterclockwise so that a curved portion 38 normally (Fig. 2) hooks under a right angled bar 39 which is part of the main operating member. During the initial depression of bar 39 the pawl 35 will be rocked clockwise idly until the curved portion 38 is free of the bar 39 whereupon the spring 37 will cause the pawl 35 to take the position shown in Fig. 3. When the bar 39 has been fully depressed and then returned the bar 39 will in its elevation strike the pawl 35 elevating the pawl 35 since the line of force acts through the center of the pivot 36. This will cause the rocking of the detent plate 30 about its pivot disengaging the same from the notch 29 of the depressed key releasing it for its return to normal by its spring 28. Upon continued elevation of the pawl 35 a straight edge 40 (Fig. 3) thereof will strike a stationary rod 41 and upon continued elevation of the pawl 35 by the bar 39 the pawl 35 will rock clockwise until its curved portion 38 is free of the bar 39, whereupon spring 37 will be effective to rock the pawl 35 to its normal position shown in Fig. 2.

Key locking devices

It is further desirable to lock the undepressed keys after a machine operation is initiated and to prevent an operation of the machine when a key is partially depressed.

For each detent plate 30 there is provided a bell crank loosely pivoted on the rod 41 consisting of an arm 42, normally engaging a related detent plate 30, and an arm 43. The arm 43 has a projection 44 and the bar 39 is adapted to pass in front of an arcuate edge of said projection, thereby locking the related detent plate 30 to prevent a depression of a key not selected for operation after a machine operation is initiated.

The projection 44 also has an arcuate edge 45 which is adapted to pass beneath the bar 39 wherever a key is being depressed and locks the bar 39 until a key is fully depressed. Hence the machine cannot be operated with a key partially depressed.

Main operating bar

The main operating bar previously referred to comprises a pair of arms 53 and 54 (Figs. 3 and 4) attached to a rock shaft 55 and between which arms is carried bar 39. The shaft 55, as will be later explained, has connections to an operating mechanism so that arms 53 and 54 are positively rocked by the shaft 55.

Differential mechanism

Figure 4:
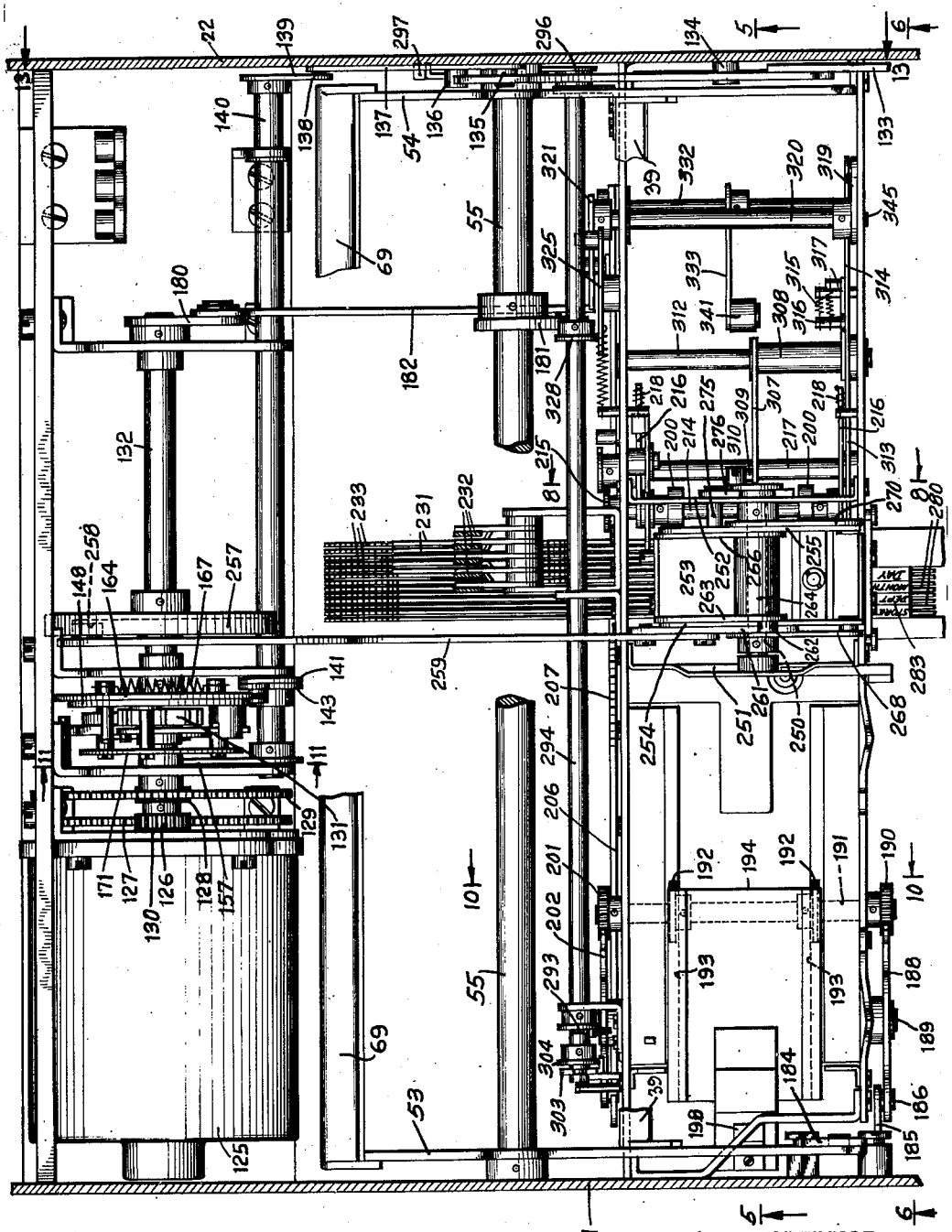
Fig. 4 is a plan view of the machine showing the relationship between the various units therein and is taken on the line 4—4 of Fig. 2.

As is best shown in Figs. 2 and 3 pivoted at 66 to each key stem is a related key cam 67 having a coupling notch 68 engageable with a coupling bar 69 when the associated key is depressed. The coupling bar 69 is part of the operating member and is carried by rearward extensions of the arms 53 and 54 (Fig. 4). Each group of keys has a related series of key cams 67 so that a selected one may be coupled to the coupling bar 69 and rocked individually counterclockwise by the depression of the arms 53 and 54.

Each key cam 67 is guided at its rearmost end by slots 70 (Fig. 2) in a stationary guide plate 71 and when the selected cam plate 67 has been rocked to its extreme position by the bar 69 a notch 72 thereof will be received by a rod 73. The key cams 67 normally rest upon the shaft 55, as shown in Fig. 2.

When a selected key cam 67 is shifted rearwardly and held in shifted position by virtue of the locking of the related depressed key a dwell or entrance 74 of a cam slot 75 will register with a rod 76 of a differentially rockable frame. Fig. 2 shows the construction of the cam slots 75 of the key cams 67 for the tens denominational group in which it will be observed that the cam slots 75 are graduated so that the rod 76 may be rocked differentially when a key cam 67 is rocked and commensurate with the digital representation of the key depressed. It is obvious that only the particular key cam 67 selected will be actuated, the others of the same group remaining in normal position.

As is best shown in Figs. 2 and 7, the rod 76 is carried by a U-shaped frame 77 loosely mounted on a shaft 78. Attached to a side arm of the frame 77 is a tens entering segment 79. The rod 80 for the cam plates 67 of the cents group is carried by a U-shaped frame 81 loosely mounted on the shaft 78 and to the frame 81 there is connected a bail 82 to which is attached the units entering segment 83. The rod 84 for the dollars group is carried by a U-shaped frame 85 loosely mounted on shaft 78 and to said frame there is secured a dollars entering segment 86.

The transaction keys 13—17 are adapted by means of a differential mechanism of the type just described to rock a frame 89 (Fig. 7) and through a cross-over bail 90 differentially set a segment 91.

The key cam 67 of the "A" clerk's key is adapted to rock a frame 87 which is secured to the shaft 78 and to the shaft 78 there is secured a segment 92. The key cam 67 of the "B" clerk's key will not rock the frame 87.

The segments 79, 83 and 86 are of the form usual in cash registers so that they can set the usual type wheels and actuate totalizers. In the present machine they have connections to be later described so as to set a punching mechanism to punch a card with an indication of the amount of the sale. The segment 91 is utilized to set a punching mechanism to punch a card to indicate the type of transaction and the segment 92 is utilized to set a punching mechanism to punch a card to indicate that the "A" clerk operated the machine, since the punching mechanism will normally punch a designation for the "B" clerk.

*Motor drive*

The motor 125 (Fig. 4) rotates a pinion 126 secured to the armature shaft and said pinion meshes with a gear 127 to which is secured a pinion 128 in mesh with a gear 129 secured to a drive shaft 130 to which is secured a ratchet wheel 131. The gear and pinion drive from the motor to the ratchet wheel comprise a speed reduction drive. Through a clutch mechanism now to be described a shaft 132 is given a single revolution for each operation of the machine.

Figure 13:
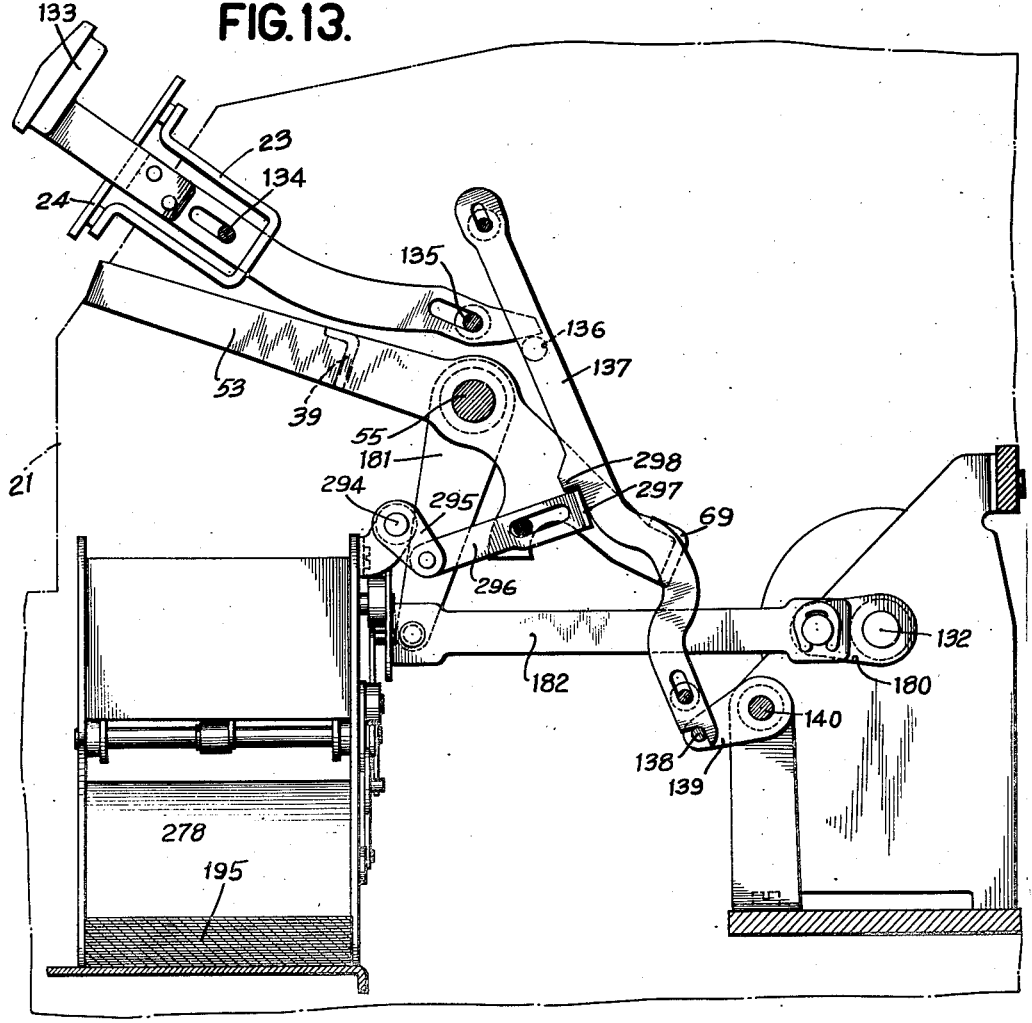
Fig. 13 is a view in side elevation taken on the line 13—13 of Fig. 4 and shows particularly the interlock between the clerk's keys and the motor release bar.

Referring to Fig. 13 at the right end of the machine there is provided a motor release bar 133 which is slidably mounted by a pair of studs 134, 135. When the motor bar is depressed its free end by a cooperation with a stud 136 carried by a slidably mounted link 137 depresses said link. The link 137 has a shoulder engaging a stud 138 carried by an arm 139 secured to a release shaft 140 so that the latter is rocked by the depression of the motor release bar 133.

To the shaft 140 there is secured an arm 141 (see Fig. 11) carrying a pin 142 in engagement with an arm 143 loosely mounted on the shaft 140. A spring 144 is attached to the stud 142 and also to a stud carried by the arm 143 so as to hold the arm 143 against the stud 142. The arm 143 has a pin and slot connection 147 to a bell crank 145 which is adapted to close contacts 146. Through the connection just described the contacts 146 are closed when shaft 140 is rocked thereby electrically connecting the motor 125 to the current supply S, as shown in Fig. 11. The armature shaft will thereby rotate the ratchet wheel 131 through the speed reduction drive just described.

Loosely mounted on the shaft 132 is a disk 148 and pivoted at 172 on the disk 148 is a clutch arm 149 provided with a clutch tooth 150. Alongside the clutch arm 149 is a shorter arm 151 lacking the clutch tooth also pivoted at 172. The clutch arm 149 carries a pin 152 adjacent an arcuate edge of arm 151. The free end of arm 151 is connected to a toggle member 153 by a link 154, the toggle member 153 being pivoted upon disk 148 at 155. The opposite end of the toggle member 153 remote from its pivot 155 is connected to a spring element 156. The action of spring 156 is such that it tends to hold clutch tooth 150 out of engagement with the clutch teeth of the ratchet wheel 131 or allow it to engage when toggle member 153 is shifted.

For the purpose of effecting the clutching action an arm 157 is connected to shaft 140 and coacts with a pin 158 carried by the arm 151. When the arm 151 is rocked by the rocking of the arm 157 the arcuate edge of arm 151 will be moved away from the pin 152 of the clutch arm 149. A spring 159 anchored to the plate 148 and to an extension 160 of the clutch arm 149 will rock the clutch arm and cause the clutch tooth 150 of the arm 149 to engage with a tooth of the ratchet wheel 131 which is now revolving. This action shifts the parts from the position shown in Fig. 11 to the position shown in Fig. 12. The spring 159 acts to hold the clutch tooth 150 in engagement with the ratchet wheel 131. Disk 148 will, thereupon be driven counterclockwise and at the termination of the counterclockwise movement a tail 162 of the clutch arm 149 will strike a fixed stud 163 thereby rocking the clutch arm 149 to effect the disengagement of the clutch tooth 150 from the ratchet wheel 131 by a reverse action. This action will also restore toggle member 153 to its normal position as shown in Fig. 11.

The plate 148 is preferably mounted on a disk 164, secured to the shaft 132, by pin and slot connections 165, 166 and connected to each other by springs 167. This construction is provided to take up shocks due to starting from a position of rest and the sudden stopping of the rotation of disk 148. The clutch mechanism just described is fully described in patent to F. Lee et al., No. 1,976,618, dated October 9, 1934.

The disk 164 has a notch 168 received by a stud 169 carried by an extension 170 of the arm 143. When the arm 143 is rocked, as previously explained, the stud 169 will be moved out of engagement with the notch 168 of the disk 164 to unlock the latter.

A safety disk 171 is carried by the disk 148 by the pivot 155, the pivot 172 of the clutch arm 149 and the arm 151, and a screw 173, but separated therefrom. The safety disk 171 is provided with a cam edge 174. The latter coacts with a lug 175 of the arm 157 to rock the arm 157, shaft 140, and the motor release bar 133 to normal position after the clutch engagement. A concentric edge of the safety disk prevents the motor release bar from again being depressed during the operation of the machine. Hence the motor release bar 133 cannot be held down during the operation of the machine. Rocking of the arm 157 to normal will, of course, through the arm 143 and spring 144 tend to rock arm 143 to open contacts 146 to open the circuit of motor 125, but the engagement of the stud 169 with the concentric edge of disk 148 will keep arm 143 shifted to retain contacts 146 closed for a complete revolution of disk 148 and therefore, shaft 132. Rocking of arm 141 will merely stretch spring 144.

As is best shown in Figs. 4 and 13 to the shaft 132 there is secured a crank arm 180 connected by a link 182 to an arm 181 secured to the shaft 55. As the arm 180 rotates a half revolution the link 182 is drawn to the right causing shaft 55 to rotate counterclockwise and then clockwise as the arm 180 completes its rotation. In this manner arms 53 and 54 are rocked downwardly and then upwardly.

Card feeding devices

The arm 53 carries a stud 183 (Figs. 6 and 10) engaging a slot in a slidably mounted link 184 to which is attached at its lower end a bracket 185 carrying a stud 186 fitting in a slot 187 of a segment 188 which is pivoted at 189.

As best shown in Figs. 6 and 10 the segment 188 meshes with a gear 190 attached to a shaft 191. The shaft 191 has pinned thereto a pair of pinions 192 meshing with rack teeth 193 formed at the bottom of a slidably mounted card carrier 194.

The cards 195 (see Fig. 5) to be punched are placed in a supply hopper 196 and upon such cards the usual presser plate 197 rests so that the lowermost card rests upon a picker 198 carried by the card carrier 194. The shoulder of the picker 198 engages the left edge of the bottom card so that movement of the carrier to the right effected by segment 188 and the gear drive just described will feed the card to the right. As the card emerges from the magazine 196 its leading edge passes into a card throat 199 and between two pairs of rollers 200 (see Fig. 8) which are normally in contact with each other but are now separated by means now to be described.

The shaft 191 (Figs. 5 and 10) carries at its end a pinion 201 meshing with a segment 202 pivoted at 203 and carrying a pin 204 engaging a slot 205 in a slidably mounted rack 206. The gear teeth 207 of the latter (Figs. 5 and 8) mesh with a pinion 208 attached to a gear 209 which meshes with a pinion 210 attached to a gear 211. The shaft 212 which carries the lower rollers is fixed in the framework and carries at one end a pinion 213 meshing with the gear 211 (see Fig. 8). The shaft 214 which carries the upper rolls has a pinion 215 meshing with the pinion 213 but a pair of arms 216 pivoted on a rod 217 carry said shaft 214 and a spring 218 (Figs. 5 and 6) connected to each arm 216 urges the engagement of the rollers. The neck 206 carries a by-pass pawl 219 (Fig. 5) adapted to strike a stud 220 carried by a double arm 221 the upper arm being provided with a stud 222 engaging an arm 223 secured to the rod 217. The rocking of the double arm 221 by the pawl 219 in the initial movement of rack 206 will rock shaft 217 and by the arms 216 the rollers 200 will be disengaged and such disengagement will be retained by the latch arm 224 (Fig. 5) which engages a shoulder 225 of one of the arms 216 during the time the card passes between the rollers 200.

Punching mechanism

The present machine is provided with a punching mechanism for punching the amount of the sale, the type of transaction, the clerk operating the machine and other fixed data comprising as shown in an example of a punched card in Fig. 9 the code number identifying the store, the department, month and day. The card to be punched is preferably of the type shown in the patent to C. D. Lake, No. 1,772,492, dated August 12, 1930. The rectangular perforations are made in columns, one in each column. Its location in the column indicates the digital value. For example, the amount punched represents 0.40. The type of transaction is indicated by numbers, 0 indicating "No sale", 1, "Charge", etc., and the number code is also applied and the designation of the clerk.

As best shown in Figs. 2 and 5 each of the segments 79, 83, 86, 91 and 92 is connected to a bell-crank shaped segment 231 by a link 232 and each segment 231 meshes with a rack slide 233. Each slide has a longitudinal slot 234 between which the card to be punched passes. Attached to the side of each rack slide 233 at each part above and below the slot is a plate 235 which gives additional thickness to the slide 233 and both the latter and the plate 235 provide a rectangular die aperture 236 in the lower part of the slide. The upper part of the slide and attached plate 235 is also provided with a rectangular aperture receiving a rectangular punch pin 237.

It is explained that for the amount keys, transaction keys and clerks' keys that the bar 69 will rock the selected cam plate 67 and the cam slot 75 in the selected cam plate 67 will rock the related frame and segment. Through the links 232 and segments 231 the rack slides 233 are moved differentially so as to position the punch pins 237 laterally over the card to the proper column position. Near the extreme rocked position of the cam plate a dwell 238 of the cam slot 75 will be ineffective to rock the associated frame and will permit slides 233 to be stationary. At this time the punch pins are depressed by mechanism now to be described.

It is also explained that the punch pin 237 for the clerks' slide is normally set to punch a designation representing the "B" clerk and is shifted under control of the "A" clerk's key to designate on the card that the "A" clerk operated the machine.

A shaft 250 (Figs. 2, 4, 5 and 8) is carried by parallel side frames 251, 252. A punch operating frame plate comprises a bottom plate 253 and two integral side plates 254 and 255 both of the latter being slotted at 256 (Figs. 2 and 5) to receive the shaft 250 and said frame is adapted to be moved up and down by a straight motion by a parallel mechanism now to be described.

Attached to the operating shaft 132 is a box cam 257 (Fig. 2) receiving a roller 258 of reciprocable link 259 which at its left end is provided with a slot 260 receiving the shaft 250. The extension 261 of the link 259 is slotted to receive a pin 262 of a bell crank 263 secured to a sleeve 264 overlying the shaft 250. The bell crank 263 carries a pin 265 receiving a notch formed in the integral side plate 254. To the sleeve 264 there is secured a bell crank 266 (Fig. 4) similar to the bell crank 263 and having a similar connection to the other side plate 255.

In a similar manner a lower extension of the link 259 has a pin and slot connection 267 (Fig. 2) to a bell crank 268 secured to the shaft 250 and which has a pin and slot connection 269 to the side plate 254 (see Fig. 2). An arm 270 (Fig. 4) similar to the arm 268 is also secured to the shaft 250 and has a similar pin and slot connection to the side plate 255. Hence the operating frame is held upwardly at four points and depressed at four points by a parallel movement until the bottom edge of the plate 253 engages the punch pins 237 and thereafter forces them through the card and into the die holes 236. Each punch pin has a projection 271 (Fig. 2) overlying punch retracting bars 272 (Figs. 2 and 5) carried by the frame to hold the punch pins upwardly for free feeding of the card in the slot 234 and for retracting the punch pins after the punching operation.

An aligning bar 273 (Fig. 2) carried by the operating frame engages aligning notches 274 of the slides 233 to align the latter prior to punching operations.

As best shown in Figs. 4 and 8 the side plate 255 carries a pin 275 passing through a slot in the side plate 252 and into a slidably mounted card stop 276 so as to depress the latter into the path of the card now being fed so as to engage with the leading edge of the card as its feeding operation is terminated. At the same time a pin 277 (see Fig. 5 only) carried by the operating frame will engage an extension of the latch 224 to rock it and unlatch the sets of rollers 200 which were previously disengaged. The card is now firmly held by the rollers and after the punching operation the bars 272 will retract the punch pins 237 by the elevation of the punch frame caused by cam 257 and during this elevation the aligning bar 273 is raised and also the card stop 276 freeing the card for further feeding operations now to be effected by the sets of rollers 200.

It is pointed out that when the segment 202 has been rocked through an angle and slide 206 has been shifted to the right the pin 204 will be at the upper end of the slot 205. The opening of the slot is formed with a dwell 226 concentric with the pivot 203 so that in further rocking the segment 202 the pin 204 will coact with the dwell 226 in the slot 205 so that the rack slide 206 is not moved during this time and at which time the punching operation is effected. This is of no consequence when the punch operating frame is depressed as rollers 200 are separated but after their engagement rack 206 is not moved during the initial restoration of segment 202 so that the rollers 200 do not feed the card until after the punch operating frame has been elevated. Thereafter rollers 200 rotate reversely by the restoration of the rack slide 206 to feed the card from the punching mechanism to a storage hopper 278. Of course, during this time the various parts of the cash register are restored and the keys are unlocked and returned to normal.

*Means for punching fixed data*

In order to punch fixed data in the card there is provided a series of eight manually settable punch slides 280 (Figs. 2, 4, and 5) similar to the slides 233 except that they have no gear connections to the machine. These slides 280 are reached through a door 285 of the machine and are settable by hand. Each slide has an indicator 282 (Fig. 2) passing through a slot of an indicator plate 283 (see Fig. 4) which indicates the proper setting of the slides for the desired designations. The slides 280 are preferably held by the usual aligning pawls 284 (Fig. 2). The door 281 gives access to the cards in the storage hopper while door 285 (see Fig. 1) gives access to the supply hopper 196.

*Interlock between motor release bar and clerks' keys*

For each clerk's key which actuates a locking mechanism for the bar 39 there is provided an arm 286 (Figs. 5, 6 and 10) there being for the two clerk's keys two of such arms which are connected together by a sleeve 287. Whenever one of the clerks' keys is depressed an end 288 thereof will engage an extension 289 of the related arm 286 to rock the arm 286 against the tension of a spring 290. Preferably each of the arms 286 is provided with a hook 291 normally catching beneath the bar 39 to lock said bar. Since the depressed clerk's key is latched in depressed position the hook 291 will be retained removed from the bar 39. When the clerk's key is unlatched the hook 291 by the spring 290 will again catch over the bar 39 when it is returned to normal.

As shown in Figs. 5, 6 and 10 one of said arms 286 has pinned thereto an extension 292 having a pin and slot connection to arm 293 attached to a rock shaft 294 which is rocked by the depression of a clerk's key.

To the shaft 294 there is secured an arm 295 (see Fig. 13) connected to a slidably mounted locking member 296 having its lug 297 normally underlying a shoulder 298 of the link 137, and said lug 297 is removed from the shoulder when a clerk's key is depressed thereby unlocking the motor release bar 133.

*Means for locking clerks' keys and motor release bar when supply of cards is exhausted*

As best shown in Fig. 10 when the last card is fed out of the supply hopper 196 the card will be removed from a feeler 306 projecting through a hole in the bottom of the card supply hopper 196 and projectible through a hole in the presser plate 197. Said feeler is carried by an arm 299 pivoted at 300 and urged upwardly by a spring 301 to project through a hole in the presser plate 197 so that a lug 302 of a link 303 connected to the arm 299 will now engage the concentric edge 304 of a plate 305 attached to the shaft 294, and which in the meantime has been rocked a slight extent clockwise. When the depressed clerk's key is unlatched shaft 294 will be rocked counterclockwise to normal and since lug 302 is now free of the edge 304 of the plate 305, the link 303 will be elevated by the spring 301. The lug 302 is now adjacent the left straight edge of plate 305 locking shaft 294 against a clockwise movement necessary in depressing a clerk's key. Since neither clerk's key can be depressed it cannot release the motor bar 133 and the latter cannot be operated until the supply of cards is replenished in the hopper 196.

*Means for preventing operation of motor release bar or clerk's key if card has not been properly fed*

The machine is preferably supplied with an interlocking mechanism which will prevent the depression of any of the clerk's keys and therefore retain the motor release bar locked in the event that a card has not been properly fed in the punching mechanism, or if the card is fed but is improperly placed in the punching position the same locking mechanism will be effective.

Referring particularly to Fig. 5, an arm 307 secured to a sleeve 308 carries at its free end a stud 309 adapted to be engaged by a pin 310 carried by the card stop 276 and therefore said arm is rocked during the punching operation. To the sleeve 308 there is secured an arm 311 (see Fig. 6). On the shaft 312 which loosely carries the sleeve 308 there is loosely mounted a double arm which comprises a feeler portion 313 and an integral extension 314. A spring 315 has one end thereof connected to a stud 316 of the arm 311 and to a stud 317 carried by the extension 314, the tension of the spring causing the lower edge of the arm 311 to engage the pin 317. By virtue of this construction, arm 311 and the feeler 313 and the extension 314 move together as a unit when the arm 307 is rocked in the manner previously described. The free end of the feeler 313 during its rocking movement is adapted to engage with a card fed in the punching mechanism and if a card has been fed and properly presented therein the movement of the feeler 313 will be stopped but the arm 307 will continue to be rocked and in this operation spring 315 will merely be stretched. In this event, a stud 318 carried by the extension 314 will not be raised sufficiently so as to engage and rock one arm of a bell crank 319 secured to a shaft 320.

If a card has not been properly fed or properly positioned in the punching mechanism the feeler 313 will rock sufficiently in the absence of the cooperation with a card so that the pin 318 will now engage the bell crank 319 and rock the shaft 320.

Figure 14:
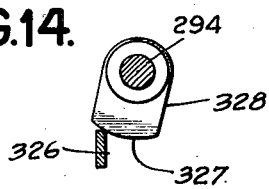
Fig. 14 is a detail view of parts of an interlocking mechanism.

Referring particularly to Fig. 5, it will be seen that the rocking of the shaft 320 in a counterclockwise direction will rock an arm 321 secured to the shaft so as to move the projection 322 of said arm away from the stud 323. This will permit a spring 324 to rock the arm 325 which carries the stud 323 so that extension 326 of the arm 325 will engage the concentric surface 327 of a locking plate 328 secured to the shaft 294 (see Fig. 14).

In view of the previous depression of the clerk's key the shaft 294 has been rocked slightly in a clockwise direction but after the termination of the operation of the machine the shaft 294 is rocked slightly in a counterclockwise direction so that spring 324 (Fig. 5) will be effective to move the extension 326 so as to coact with the left edge of the locking plate 328 thereby locking the shaft 294. As previously described, locking of this shaft against a clockwise movement will prevent the depression of a clerk's key and therefore retain the motor release bar 133 locked.

*Means for locking clerks' keys and motor release bar when storage hopper is filled*

The machine is preferably supplied with a mechanism which will determine when the storage hopper has been filled with punched cards and will cause the clerks' key to be locked and thereby the motor release bar locked against operation.

This mechanism is best shown in Figs. 4 and 5 wherein it will be seen that a link 329 connects the arm 221 and a bell crank, comprising an arm 330 and arm 331, which is loosely mounted upon a shaft 332. Fixed to the shaft 332 is an arm 333 and a second shorter arm 334. Pivoted upon a stud 335 on the arm 331 of the bell crank is a plate 336 which is formed with a bayonet shaped slot 337. A spring 338 is connected to an extension of the plate 336 and also to a stud 340 carried by the arm 334. The pin 340 normally fits in the vertical portion of the bayonet slot 337 and the tension in the spring 338 keeps it in such position so that by virtue of the above connection, it will be seen that the bell crank 330, arms 333 and 334 and plate 336 move as a unit under certain conditions.

During the initial operation of the machine, the pawl 219 will rock the arm 221 as previously described shifting the link 329 to the right and rocking the elements comprising the aforedescribed unit counterclockwise thereby moving a roller 341 carried at the extremity of the arm 333 into the storage hopper 278. Eventually the pawl 219 will pass by the arm 221 permitting a spring 342 connected to the bell crank 330 to return the unit to the normal position shown in Fig. 5. The unit is rocked counterclockwise for each card feeding operation and as the cards 195 are fed into the storage hopper 278, the height of the stack increases until eventually in the counterclockwise rocking of the unit the roller 341 will contact with the top surface of the uppermost card 195 in the stack 278. As the height of the stack increases, the arm 333 will be held immovable for a longer time as the unit is rocked in a counterclockwise direction and the rocking of the bell crank 330—331 in a counterclockwise direction will draw the plate 336 downwardly so that the horizontal portion of the bayonet slot 337 will approach the pin 340 and the downward movement of the plate 336 independently of the arm 333 is increased as the height of the stack of cards increases. Eventually, the pin 340 will be in full registration with the horizontal portion of the bayonet slot 337 permitting the tension in the spring 338 to rock the plate 336 clockwise about its pivotal point 335. The plate 336 carries a pin 343 and such pin in the clockwise rocking of the plate 336 will coact with an arm 344 secured to the aforementioned shaft 320 thereby causing said shaft to be rocked and as is explained in the preceding section, the rocking of the arm 325 and the subsequent locking of the shaft 294. In this manner, when the depressed clerk's key is returned to normal, the shaft 294 will be locked against movement and, therefore, the clerks' keys and the motor release bar will be locked against operation until the supply of punched cards is removed from the hopper 278.

Whenever the machine becomes locked under the two circumstances previously described, that is, due to the improper feeding of a card, or the failure of a card to be fed, or the filling of the storage hopper 278 the parts may be reconditioned for subsequent locking operations by manually grasping a stud 345 (see Figs. 4 and 6) which is carried by the bell crank 319 and moving it to the right as shown in Fig. 6.

This operation will cause shaft 320 to be rocked and cause the high portion 322 (Fig. 5) of the arm 321 to cam the lock arm 325 to normal position.

Also in this operation of the machine, the arm 344 (see Fig. 5) by its coaction with the stud 343 will rock the plate 336 about its pivotal point 335 to cause the vertical portion of the bayonet slot 337 to register with the pin 340. Thereupon the spring 338 will be effective to cause the vertical portion of the bayonet slot 337 to register with the pin 340 at which time the parts are in the normal position shown in Fig. 5. Obviously, it is necessary for the restoration of said parts to normal to previously withdraw the cards 195 out of the overfilled storage hopper 278.

Access to the stud 345 is had by opening of the door 281. If it is desired at any time to lock the machine against operation all that is necessary is to cause by the stud 345 the rocking of the bell crank 319 so as to rock the shaft 320 and cause the locking of the machine in the manner previously described. Thus a very convenient means of locking the machine against operation when desired is afforded, and such access may only be had by the opening of the door 281. If so desired, the latter may be provided with a suitable lock which is retained by persons authorized to have access to such locking instrumentalities.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a punching machine, in combination, a plurality of sets of manipulative devices, selected ones of each set being pre-set manually prior to a punching operation, a plurality of differentially positioned punch pin carrying bars, one for each set of manipulative devices, and each provided with a punch pin and a cooperating die hole between which a card is positioned, a set of cam plates for each set of manipulative devices, the cam plate of each set having graduated cam slots and each cam plate being connected to the related manipulative device for selection thereof, a differentially positionable frame connected to each punch pin carrying bar and carrying a rod cooperating with the cam slot of the cam plate selected by the pre-set manipulative device, common means for rocking the selected cam plates, and means for operating the punch pins to effect a punching operation.

2. In a punching machine, in combination, a plurality of punch pin carrying bars each provided with a single punch pin and a correlated die hole oppositely disposed of a card receiving slot in the bar, a differentially rockable frame for each bar and connected thereto, a plurality of sets of pre-set manipulative devices, a plurality of sets of cam plates, each set having graduated slots for rocking the related frame when the cam plate selected by the pre-set key is rocked, a common operating means for rocking the selected cam plates, a driving mechanism for said machine, a coupling means for said operating means and driving mechanism, and means operated by one of said sets of manipulative devices for rendering the coupling means effective.

3. In a punching machine, in combination, a plurality of bars, each provided with a single punching pin and a correlated die aperture oppositely disposed of a card receiving slot in the bar, a card feeding mechanism for feeding a card to be punched from a supply hopper in the slots of said bars to a predetermined position, a plurality of sets of manipulator devices and differential mechanism controlled thereby for positioning said bars, common operating means for operating the punch pins, the differential mechanism and card feeding mechanism, a driving mechanism, manipulative means for causing the coupling of the driving mechanism with said operating means, interlocking means for preventing the operation of the manipulative means unless one of said sets of manipulative devices is operated, and means cooperating with cards in said hopper for causing the locking of the last named set of manipulative devices upon the absence of a card in said hopper.

4. A punching machine comprising a plurality of slotted differentially settable bars, each provided with a single punch pin and a cooperating die hole opposite a card receiving slot, an operating means for said plurality of punch pins comprising a bar positioned over said pins and having integral side plates, two pairs of bell cranks connected to said side plates and arranged to depress said bar equally at four spaced positions, common means for simultaneously operating said bell cranks to depress said bar, and an aligning bar carried by said punch pin operating bar for aligning the punched pin carrying bars when the punch operating bar is depressed.

5. A punching machine comprising a plurality of differentially positioned bars slotted to receive a card to be punched, and each bar provided with a single punch pin and a cooperating die hole opposite of said slot, an operating means for said plurality of punch pins comprising a bar positioned over said pins and having integral upstanding side plates, a shaft fitting in slots of said side plates, two pairs of bell cranks mounted on said shaft, each pair being connected together for simultaneous movement and spaced for a connection to said side plates, and means for rocking said bell cranks to cause an equal movement of said bar at four spaced positions.

6. In a punching machine, in combination, a plurality of differentially positionable punch carrying bars each provided with a slot receiving a card and carrying opposite of said slot a single punch pin and provided with a cooperating die hole, an operating means for said punches comprising a punch operating bar and two pairs of bell cranks connected to said bar for depressing the bar equally at four positions, and an aligning bar carried by said punch operating bar for aligning the punch pin carrying bars when the punch operating bar is depressed.

7. In a punching machine, in combination, a plurality of differentially positionable punch pin carrying bars, each provided with a slot receiving a card to be punched and carrying a single punch pin and provided with a cooperating die hole, a card feeding mechanism for feeding a card through said slotted bars to cooperate with said punch pins, an operating means for said punches comprising a punch operating bar and two pairs of bell cranks connected to said bar for depressing said bar equally at four positions, and a card stop carried by said operating bar and movable in the path of the card being fed to predetermine the extent of feeding of the card to be punched.

8. In a punching machine, a plurality of bars carrying punch pins for punching at predetermined positions on a card, a set of normally contacting rollers, a reciprocable operating means, means connected to said operating means to rotate said rollers and to feed a card to said punches and to said set of rollers, means controlled by said operating means for separating the set of rollers to freely receive the leading edge of the card, means for operating the punch pins, and means for causing said rollers to contact with each other after the punching operation whereby said rollers driven by said operating means feed the punched card out of cooperation with said punch pins.

9. In a punching machine, punching mechanism, reciprocable operating means, card ejecting rollers driven reversely and then forwardly by said reciprocable operating means and normally in frictional contact, means operated by the reciprocable operating means to feed a card to said punch mechanism and to said rollers and to cause the operation of means to effect the separation of said card ejecting rollers to freely receive the card during their reverse rotation, and means effective after the punching operation to effect the frictional contact of said rollers whereby their forward rotation by said reciprocable operating means causes the feeding of the card from said punching mechanism.

10. In a punching machine, in combination, a punching mechanism, card feeding rollers normally in contact with each other, means for rotating said rollers reversely and then forwardly, means for feeding a card to said punching mechanism and to said card feeding rollers, means for separating said rollers to freely receive a card fed by said card feeding means when said rollers are rotated reversely, a card stop, means for positioning the card stop in the path of a card being fed to predetermine the extent that the card is fed to said rollers, and means for causing said rollers to contact with each other to effect the feeding of the card from said punching mechanism as said rollers are rotated forwardly.

11. In a punching machine, a card feeding mechanism, a card punching mechanism, means for causing the card feeding mechanism to feed a series of cards from a supply hopper to said punching mechanism, means to feed a punched card from said punching mechanism to a storage hopper, an operating means for said card feeding mechanism, said card punching mechanism and both of said card feeding means, means comprising a plurality of card sensing devices arranged and constructed to determine whether, (1) a card is in said supply hopper (2) a card has been fed to the punching mechanism (3) punched cards have over-filled the storage magazine, a common locking means to lock said operating means against operation, and means whereby each of said card sensing devices causes when any of the above conditions ensue the operation of the common locking means.

12. A control device for a card punching machine including a card punching mechanism, an operating means therefor, means for feeding punched cards from said punching mechanism to a storage hopper, a card sensing lever operated for each machine operation to contact with the top card in said storage hopper, a locking means for said operating means, a movable member having a resilient connection to said card sensing lever for movement therewith, said member having an invariable movement irrespective of blocking of said card sensing lever by cards in said magazine, and means rendered effective by a predetermined blocking of said card sensing lever for causing said member to render the locking means effective.

13. In a punching machine, in combination, a punching mechanism, a plurality of sets of manipulative devices for controlling means to cause the setting of said punching mechanism, an operating means for said punching mechanism, a driving mechanism, manipulative means for causing a coupling of said driving mechanism and said operating means, interlocking means to prevent the operation of said manipulative means unless one of said sets of manipulative devices is operated, means for feeding a card from a supply hopper to said punching mechanism, and punched cards from said punching mechanism to a storage hopper, locking means for said manipulative means, means for controlling said locking means comprising a plurality of card feeling devices each one of which is arranged to coact with a card in said supply hopper, in said storage hopper and in said punching mechanism, means for causing one of said card feeling devices to effect the operation of the locking means when said supply hopper is empty, means for causing another of said card feeling devices to effect the operation of the locking means when said storage hopper is over-filled, and means for causing the remaining card feeling device to effect the operation of the locking means if a card is not fed to said punching mechanism.

FREDERICK L. FULLER.